US009512776B2

(12) United States Patent
Eilemann et al.

(10) Patent No.: US 9,512,776 B2
(45) Date of Patent: Dec. 6, 2016

(54) DEVICE FOR COOLING CHARGE AIR, SYSTEM FOR CONDITIONING CHARGE AIR, AND INTAKE MODULE FOR AN INTERNAL COMBUSTION ENGINE

(75) Inventors: Andreas Eilemann, Erdmannhausen (DE); Jürgen Stehlig, Neckartenzlingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 0 days.

(21) Appl. No.: 13/994,834

(22) PCT Filed: Dec. 17, 2011

(86) PCT No.: PCT/EP2011/073154
§ 371 (c)(1),
(2), (4) Date: Jun. 17, 2013

(87) PCT Pub. No.: WO2012/080508
PCT Pub. Date: Jun. 21, 2012

(65) Prior Publication Data
US 2013/0276763 A1    Oct. 24, 2013

(30) Foreign Application Priority Data

Dec. 17, 2010 (DE) .................. 10 2010 063 324

(51) Int. Cl.
*F02B 51/00* (2006.01)
*F02B 29/04* (2006.01)
(Continued)

(52) U.S. Cl.
CPC .......... *F02B 51/00* (2013.01); *F02B 29/0412* (2013.01); *F02B 29/0437* (2013.01);
(Continued)

(58) Field of Classification Search
CPC ... F02B 29/0406; F02B 51/00; F02B 29/0437; F02B 29/0412; F28D 7/0066; F28D 7/0083; F28D 7/0091; F28F 1/022
(Continued)

(56) References Cited

U.S. PATENT DOCUMENTS 4,104,999 A * 8/1978 Ullrich ..................... 123/563
5,394,854 A * 3/1995 Edmaier et al. .......... 123/563
(Continued)

FOREIGN PATENT DOCUMENTS

CN    101120160 A    2/2008
CN    101124395 A    2/2008
(Continued)

OTHER PUBLICATIONS

International Search Report, PCT/EP2011/073154, May 7, 2012, 3 pgs.
(Continued)

*Primary Examiner* — Stephen K Cronin
*Assistant Examiner* — Kevin Lathers
(74) *Attorney, Agent, or Firm* — Paul D. Strain, Esq.; Strain & Strain PLLC

(57) ABSTRACT

The present invention relates to a device for cooling charge air for an internal combustion engine of a vehicle. The device comprises a plurality of first coolant pipes for conducting a first coolant and a plurality of second coolant pipes for conducting a second coolant, wherein the first coolant pipes and the second coolant pipes extend in a longitudinal extension direction of the device and the plurality of first coolant pipes is arranged adjacent to the plurality of second coolant pipes in a transverse extension direction of the device.

10 Claims, 3 Drawing Sheets

Figure 1:
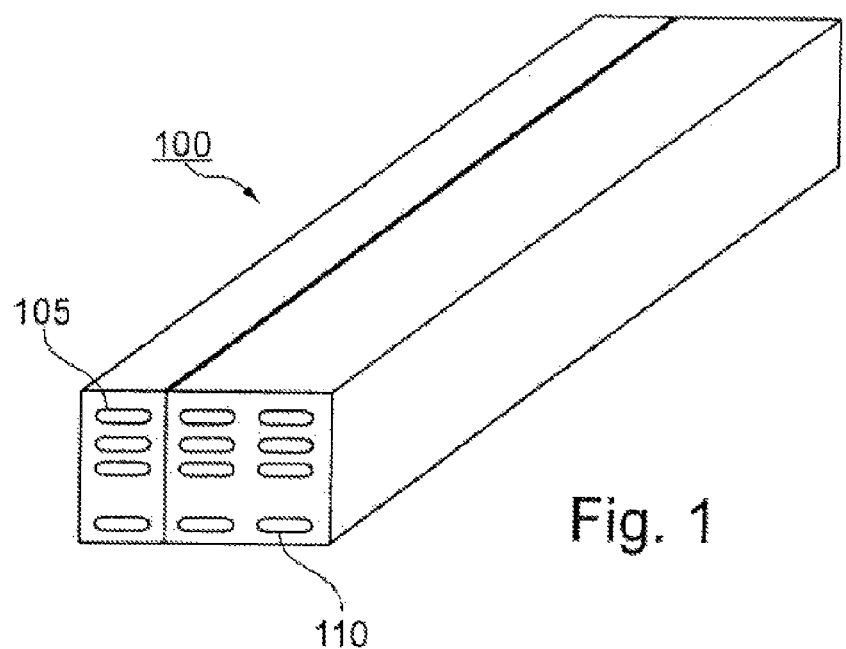

(51) Int. Cl.
*F28D 7/00* (2006.01)
*F28D 7/16* (2006.01)
*F28D 21/00* (2006.01)
*F28F 1/02* (2006.01)

(52) U.S. Cl.
CPC ......... *F28D 7/0091* (2013.01); *F28D 7/1623* (2013.01); *F01P 2060/02* (2013.01); *F28D 2021/0082* (2013.01); *F28F 1/022* (2013.01); *Y02T 10/146* (2013.01)

(58) Field of Classification Search
USPC ........................................................ 123/542
See application file for complete search history.

(56) References Cited

U.S. PATENT DOCUMENTS

| | | | |
|---|---|---|---|
| 6,688,292 B2 * | 2/2004 | Ruppel et al. | 123/563 |
| 7,717,069 B2 | 5/2010 | Mokire et al. | |
| 2002/0011242 A1 | 1/2002 | Ruppel et al. | |
| 2002/0157814 A1 * | 10/2002 | Rhodes et al. | 165/135 |
| 2006/0278377 A1 * | 12/2006 | Martins et al. | 165/140 |
| 2009/0314483 A1 * | 12/2009 | Kalbacher | 165/185 |

FOREIGN PATENT DOCUMENTS

| | | |
|---|---|---|
| CN | 101490382 A | 7/2009 |
| DE | 691 32 499 T2 | 4/2001 |
| DE | 10 2004 045 661 A1 | 4/2006 |
| DE | 10 2005 049 310 A1 | 4/2007 |
| DE | 10 2006 008 826 A1 | 8/2007 |
| DE | 10 2007 013 302 A1 | 9/2007 |
| DE | 10 2007 030 464 A1 | 1/2009 |
| EP | 1 111 217 A2 | 6/2001 |
| EP | 1 985 953 A1 | 10/2008 |
| EP | 2 161 429 A2 | 3/2010 |
| FR | 2 895 451 A1 | 6/2007 |
| JP | 2001-248448 | 9/2001 |
| JP | 2007-309172 | 11/2007 |
| JP | 2010-249129 | 11/2010 |
| WO | WO 2004/085810 A2 | 10/2004 |
| WO | WO 2004/113815 A1 | 12/2004 |

OTHER PUBLICATIONS

German Search Report, DE 10 2010 063 324.0, Sep. 30, 2011, 8 pgs.
Chinese Search Report, Appl. No. 201180059826.X, Jan. 30, 2015, 2 pgs.

* cited by examiner

DEVICE FOR COOLING CHARGE AIR, SYSTEM FOR CONDITIONING CHARGE AIR, AND INTAKE MODULE FOR AN INTERNAL COMBUSTION ENGINE

CROSS-REFERENCE TO RELATED PATENT APPLICATIONS

This application is a National Stage of International Application No. PCT/EP2011/073154, filed Dec. 17, 2011, which is based upon and claims the benefit of priority from prior German Patent Application No. 10 2010 063 324.0, filed Dec. 17, 2010, the entire contents of all of which are incorporated herein by reference in their entirety.

The present invention relates to a device for cooling charge air for an internal combustion engine of a vehicle, an intake module for supplying an internal combustion engine of a vehicle with compressed and cooled charge air, and a system for conditioning charge air for an internal combustion engine of a vehicle.

The ever-growing trend towards downsizing in car engines is often achieved by the introduction of turbocharged engines. Whereas the charge pressures were previously still relatively low, in particular in diesel engines the charge pressure is rising rapidly. However in petrol engines too, values are rising continuously. Thus also the temperatures of the charge air are rising significantly and will soon reach the 200° C. mark or more. Rising charge pressures in charged engines increase the demands for charge air cooling considerably, in particular when the target temperature of the charge air is lowered further. Therefore charge air coolers must be developed which are able to meet these challenges.

A simple charge air cooling is achieved by direct, air-cooled charge air coolers in compact or planar construction. If the construction space is limited, for powerful engines indirect, fluid-cooled charge air coolers have been developed which allow a power increase for the charge air cooling due to the better heat transmission between the charge air and the coolant, or between the coolant and ambient air on operation in the low-temperature coolant circuit. For a further power increase, planar low-temperature coolers are supplemented by wheelarch coolers, so that a high heat dissipation from the low-temperature coolant circuit can still be guaranteed. When this is no longer expedient, also so-called "cascaded cooling" through a high-temperature circuit and a low-temperature circuit can be introduced. Here typically two coolers connected in series are used, wherein the first precools the charge air using coolant from the high-temperature circuit, and the second integrated in the low-temperature circuit allows efficient cooling to the target value (ambient temperature+15 K or similar). Thus the load on the low-temperature circuit, which is usually operated with a lower coolant throughput, is relieved and the resulting charge air temperature is lower.

WO 2004/085810 A2 discloses a system for cooling at least part of a vehicle with a heat-transmission fluid circuit. The system comprises a low-temperature heat transmitter and at least one device heat transmitter, the heat transmission surface of which is divided into a first and a second heat transmission portion, through which flows a heat transmission fluid.

The object of the present invention is to provide an improved device for cooling charge air for an internal combustion engine of a vehicle, an improved intake module for supplying an internal combustion engine of a vehicle with compressed and cooled charge air, and an improved system for conditioning charge air for an internal combustion engine of a vehicle.

This object is achieved by a device, an intake module and a system according to the independent claims.

The present invention is based on the knowledge that with a combination of "cascaded cooling" in the high- and low-temperature circuits and a compact cooler construction which allows integration of an indirectly cooled charge air cooler in an intake pipe or intake module, the efficiency of the charge air cooling can be increased. Following this approach, a charge air cooler can be produced which combines the two circuits in one component but nonetheless is very compact and can be integrated in an intake pipe. A corresponding construction of a cooler designed following this approach therefore allows precooling of the charge air by the high-temperature circuit and cooling of the charge air to the target value by the low-temperature circuit. The construction can be made so compact that the cooler can be integrated in an intake module.

Advantageously according to the approach presented here there is no need to use two coolers mounted in series independently of each other, since integration of two coolers in the intake pipe of a modern engine would prove difficult and complex. The approach presented here, because of the integration of the cooler in the intake pipe, entails the advantage of a small pressure drop for the charge air. Furthermore construction space can be saved since only one component is required for integration in the assembly process of the intake pipe. Also placing the high-temperature and low-temperature components in the immediate vicinity of an intake pipe pressure sensor allows where applicable an additional integration of control elements.

The present invention creates a device for cooling charge air for an internal combustion engine of a vehicle, wherein the device comprises the following features:

a plurality of first coolant pipes for conducting a first coolant; and a plurality of second coolant pipes for conducting a second coolant, wherein the first coolant pipes and the second coolant pipes extend along a longitudinal extension direction of the device and the plurality of first coolant pipes is arranged adjacent to the plurality of second coolant pipes in a transverse extension direction of the device.

The internal combustion engine can for example be a charged diesel engine or petrol engine of a car or utility vehicle. The charge air can be an air quantity compressed by a vehicle compressor and hence heated, which e.g. has been drawn from the ambient air supply through an intake opening of an intake module or intake pipe of the vehicle and supplied to the compressor. The device can substantially be formed as an oblong cube which at least partly comprises a housing for the coolant pipes. A longitudinal extension of the device can be determined substantially through a length of the coolant pipes, and a transverse extension of the device can be determined substantially through a number of coolant pipes arranged adjacent in the transverse extension direction. The plurality of first coolant pipes can form a first cooler part of the device and the plurality of second coolant pipes can form a second cooler part of the device.

The number of first coolant pipes can correspond to a number of second coolant pipes. Alternatively the number of coolant pipes may differ. The coolant pipes may be arranged parallel to each other. They may e.g. have a round or elliptical cross section and for example consist of metal. The first and second coolant pipes can be arranged above each other, each forming a stack, wherein the individual coolant pipes can touch or can be spaced from each other. In the transverse extension direction of the device, the stacks of first and second coolant pipes can be arranged next to each other. Here too the coolant pipes of the adjacent stack can touch or be spaced from each other. A number of coolant pipes arranged above each other may be the same for the plurality of first coolant pipes and the plurality of second coolant pipes. Here the number of coolant pipes arranged above each other can be selected freely according to circumstances. Thus the device may for example have adjacent stacks each containing nine coolant pipes. The number of coolant pipes arranged above each other determines the height of the device.

The first and second coolants can for example be present as fluids with the same or different composition which are each suitable for good heat exchange. Furthermore the first and second coolants can have different temperatures in operation of the device, e.g. the first coolant can have a higher temperature than the second coolant, wherein however both temperatures are lower than that of the charge air heated by the compressor. Accordingly the charge air can be cooled such that the charge air is precooled by heat transmission to the first coolant conducted in the first cooler part of the device, and be cooled further to a target temperature by heat transmission with the second coolant conducted in the second cooler part of the device.

According to one embodiment, the device can have a first base which surrounds an end region of the plurality of first coolant pipes and of the plurality of second coolant pipes. Furthermore the device can have a second base which surrounds a further end region opposite the end region of the plurality of first coolant pipes and of the plurality of second coolant pipes. The first and second bases can e.g. each be connected with a tank in the form of a cap which receives the end region and the further end region respectively. The end region and the further end region can thus be surrounded by the first and second base with the respective tank such that the individual coolant pipes are rigidly fixed within the device. Thus the device can easily be constructed compactly and lightweight.

Furthermore the first tank can have a first inlet connection for the inlet of a first coolant into the plurality of first coolant pipes and a second inlet connection for the inlet of second coolant into the plurality of second coolant pipes. The first and second inlet connections can each be designed as connecting pieces which extend outward from the first tank and can be connected with a suitable connecting piece of the first and second coolant circuits respectively. The tank can have a separator which prevents an undesirable mixing of the first and second coolants on supply to the coolant pipes.

The first tank furthermore can have a first outlet connection for the outlet of the first coolant from the plurality of first coolant pipes, and also or alternatively a second outlet connection for the outlet of the second coolant from the plurality of second coolant pipes. The first and/or second outlet connections can also be designed as connecting pieces which extend outward from the first tank and can be connected with a further suitable connecting piece of the first and second coolant circuits respectively.

Alternatively the second tank can have a first outlet connection for the outlet of the first coolant from the plurality of first coolant pipes and/or a second outlet connection for the outlet of the second coolant from the plurality of second coolant pipes.

Thus the first and the second base simultaneously fulfill the task of fixing the coolant pipes and, in conjunction with the tank, the task of supplying the coolant pipes with the respective coolant provided. Thus advantageously no separate devices are required for fixing the coolant pipes and for supplying the coolant, which leads to a more compact and lightweight construction of the device. An arrangement of the first inlet connection in the first tank and the first outlet connection in the second tank, or the second inlet connection in the first tank and the second outlet connection in the second tank, conducts the respective coolant through the device along the I-flow principle. However an arrangement of the first inlet connection and the first outlet connection in the first tank, or the second inlet connection and the second outlet connection in the first tank, conducts the respective coolant through the device in the U-flow principle. The first and second bases can have at least one separator which prevents an undesirable mixing of the first and second coolant on supply to the coolant pipes.

According to one embodiment, the first base can have a flange which extends at least partly around a periphery of the device. For example the flange can surround the device as a peripheral collar spaced from the base plate of the first base. Advantageously the flange constitutes a stop of the device which is easy to produce and e.g. limits the insertion of the device in a housing of an intake module such that the device is positioned in the housing of the intake module in the correct function position.

According to a further embodiment, the plurality of first coolant pipes and also or alternatively the plurality of second coolant pipes can be present in the form of pipes bent into a u-shape. As an alternative to the bent pipes, the connection can also be selected through a separator in the first end region and the omission of the separator in the second end region, such that straight pipes can be used. In this way a U-flow principle in the device can be achieved. Also when U-shaped, the coolant pipes can be arranged above each other in a height extension of the device in the manner of a stack. A U-flow principle achieved at least in part in the device offers the advantage of a further refined coolant temperature fall within the device, whereby the heat transmission between the charge air and the coolant can be controlled better and structured more efficiently.

Furthermore the device can have a plurality of ribs for conducting the charge air. In each case one rib of the plurality of ribs can be arranged between a layer of coolant pipes of the plurality of first coolant pipes and an adjacent layer, in the transverse extension direction of the device, of the plurality of second coolant pipes. The ribs can be designed continuous or separated. The use of ribs constitutes a simple possibility for orienting or further aligning the flow of charge air through the device so as to achieve an optimum efficiency of the device.

The present invention furthermore creates an intake module for supplying an internal combustion engine of a vehicle with compressed and cooled charge air, wherein the intake module comprises the following features:

a housing for conducting the charge air from a compressor of the vehicle to the internal combustion engine of the vehicle, wherein the housing forms a flow channel for the charge air and has an opening for receiving a device for cooling charge air for an internal combustion engine of a vehicle; and a device as described above for cooling charge air for an internal combustion engine of the vehicle which is received by the opening in the housing such that the plurality of first coolant pipes and the plurality of second coolant pipes are arranged transverse to the flow channel for the charge air, such that the plurality of first coolant pipes is located upstream in the flow channel and the plurality of second coolant pipes is located downstream in the flow channel.

The intake module can for example be arranged close to the internal combustion engine of the vehicle. The housing of the intake module can have a connection for a charge air guide coming from the compressor or a connection for a control device for controlling the mass air flow, a receiver region for the device presented here which has the opening for receiving, and a distribution device for distributing the charge air conditioned by the device to a plurality of cylinders of the internal combustion engine. The assemblies listed here can be arranged in the order cited in a flow path of the air or charge air. The plurality of first coolant pipes can form the first cooler part through which the charge air flows first and is cooled, and the plurality of second coolant pipes can form the second cooler part through which the precooled charge air then flows and is cooled to the target temperature.

The present invention furthermore creates a system for conditioning charge air for an internal combustion engine of a vehicle, wherein the system comprises the following features:

an intake module as described above for supplying an internal combustion engine of a vehicle with compressed and cooled charge air;

a high-temperature coolant circuit for conducting the first coolant, which has a high temperature, wherein the high-temperature coolant circuit is connected with the plurality of first coolant pipes; and a low-temperature coolant circuit for conducting the second coolant, which has a low temperature, wherein the low-temperature coolant circuit is connected with the plurality of second coolant pipes.

The high-temperature coolant circuit can be connected with a first inlet connection and with a first outlet connection of the device for cooling charge air, in order to supply the first coolant to the device for cooling charge air. Accordingly the low-temperature coolant circuit can be connected with a second inlet connection of the device for cooling charge air and with a second outlet connection of the device for cooling charge air, in order to supply the second coolant to the device for cooling charge air.

Figure 2:
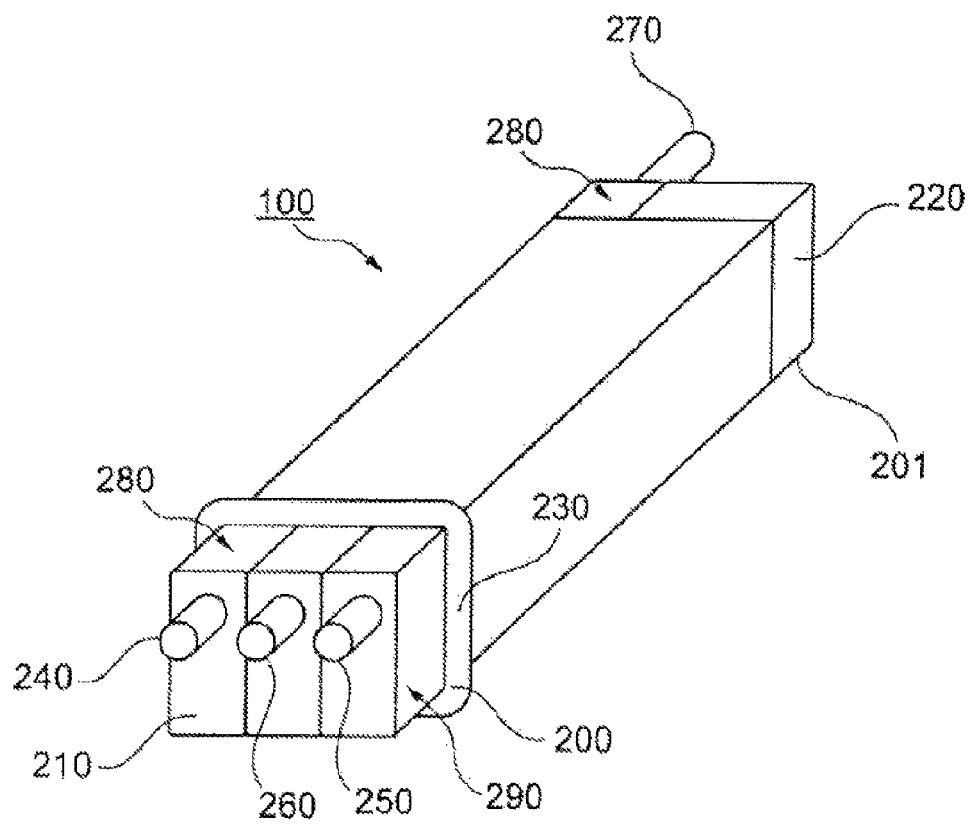
Figure 3:
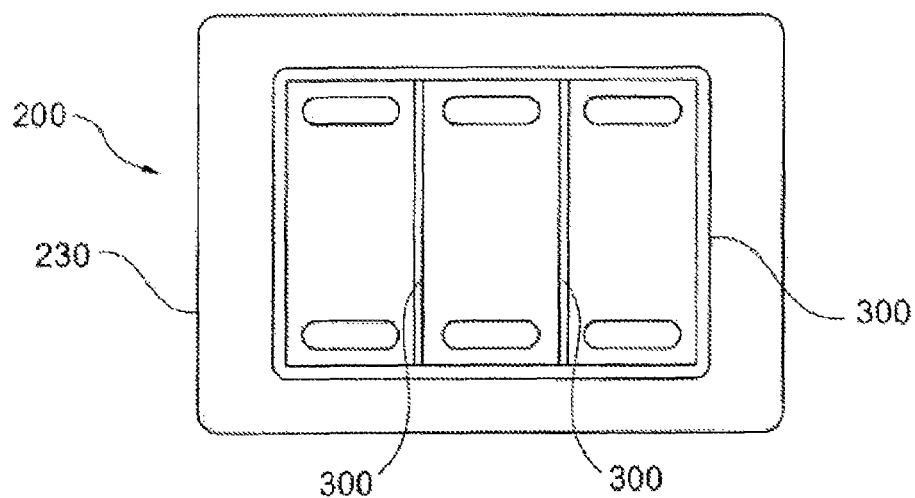
Figure 4A:
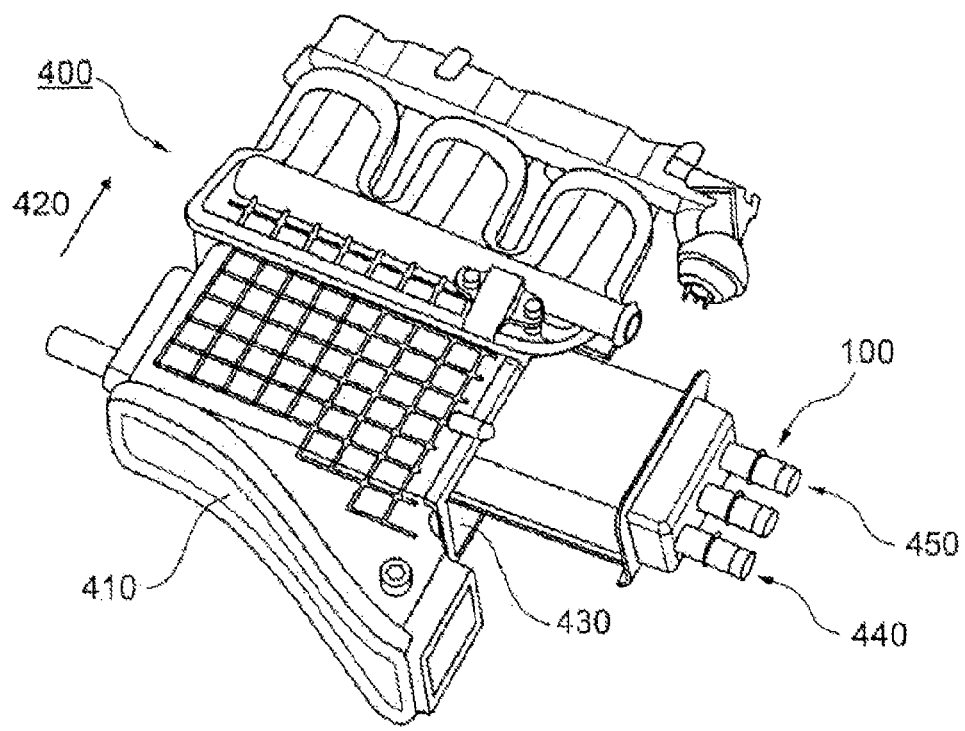
Figure 4B:
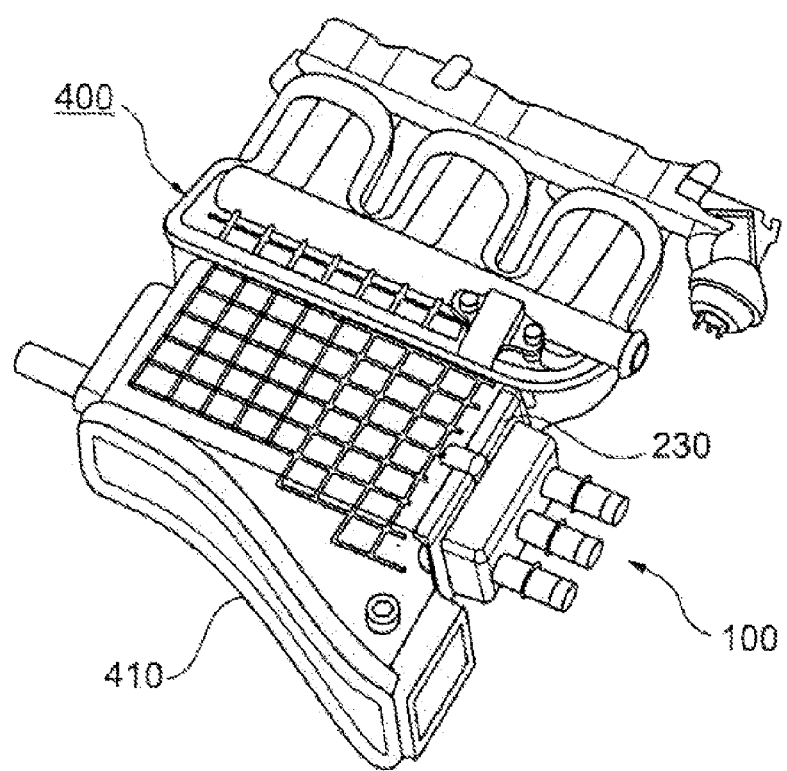

Advantageous embodiment examples of the present invention are described in more detail below with reference to the enclosed drawings. The drawings show:

FIG. 1 a perspective view of a portion of a device for cooling charge air according to an embodiment example of the present invention;

FIG. 2 a perspective view of a device for cooling charge air according to an embodiment example of the present invention;

FIG. 3 a section view of a device for cooling charge air according to an embodiment example of the present invention;

FIG. 4a a perspective view of an intake module according to an embodiment example of the present invention; and FIG. 4b a further perspective view of the intake module from FIG. 4a.

In the description which follows of preferred embodiment examples of the present invention, for the elements shown in the various drawings and having similar effect, the same or similar reference numerals are used, wherein a repeated description of these elements has been omitted.

Embodiment examples are described below of a charge air cooler with cascaded cooling by high- and low-temperature coolant circuits, for installation in an intake module, and a corresponding intake module.

The figures which follow show inter alia an embodiment of the charge air cooler proposed here which combines the two circuits in one component but nonetheless is very compact and can be integrated in an intake pipe.

FIG. 1 shows in a perspective view as a sketch a device 100 for cooling charge air, for installation in an intake module, according to one embodiment example of the present invention. A plurality of first coolant pipes 105 and a plurality of second coolant pipes 110 are shown, which are preferably arranged in a cuboid housing, preferably as flat pipes, in a respective plane and parallel to each other. For the sake of clarity only one of the first coolant pipes and only one of the second coolant pipes have been given a reference numeral. In the embodiment example shown in FIG. 1, the first coolant pipes 105 are formed as straight pipes and are arranged above each other in a stack or row. The second coolant pipes 110 are also formed as straight pipes and are also arranged above each other in a stack or row. The plurality of first coolant pipes 105 form a first cooler part for conducting a first coolant from the high-temperature coolant circuit, and the plurality of second coolant pipes 110 form a second cooler part for conducting a second coolant from the low-temperature coolant circuit. The first coolant pipes 105 and the second coolant pipes 110 can have an identical or different inner or outer shape, preferably a rectangular or elliptical shape or cross-section. Ribs (not shown in the view in FIG. 1) for conducting charge air through the device are arranged between the individual layers of coolant pipes 105 and 110 arranged adjacent in the transverse direction of the device.

FIG. 1 shows the device 100 in an embodiment as a three-row pipe-rib system with three identical coolant pipes 105, 110 and continuous ribs, wherein coolant from the high-temperature circuit flows through the first pipe row of coolant pipes 105 in the I-flow principle, and wherein the second and third pipe rows of coolant pipes 110 allow optimum heat transmission between the precooled charge air and the low-temperature coolant as a cross-counterflow in the U-flow principle. The device in FIG. 1 comprises ten ribs (not shown in the drawing) and in each case nine first coolant pipes 105 and second coolant pipes 110, of which for the sake of clarity only four of each are shown in the drawing. The coolant pipes 105 and 110 are formed for example as MPE pipes (multi-port extruded pipes) each with a depth of 32 mm. However other production methods for the pipes and other pipe depths can be used. A spacing between the individual stacks or rows is 4.5 mm. Including an upper and a lower side cover of the device, a height of the device shown is around 65 mm. A width of the device shown is 105 mm. These and the following dimensions are given merely as examples and can vary.

FIG. 2 shows in a perspective depiction an overall view of an embodiment example of a device 100 for cooling charge air in the form of an integrated and indirect charge air cooler. The device 100 comprises the portion shown in FIG. 1. A first tank 210 and a second tank 220 are shown which terminate the device 100 at an upper and a lower end in the manner of a cap. The tanks 210 and 220 each seal against a base 200 which receives and positions the coolant pipes 105 and 110. An end edge of the first base 200 is formed as a flange 230 surrounding the device 100. Using an arrangement of inlet and outlet connections for the coolant in boxes 210, 220, a function method of the device 100 again becomes clear, according to which the first cooler part is operated in the I-flow principle and the second cooler part in the U-flow principle. Accordingly the first box 210 has a first inlet connection 240 for inlet of the first coolant into the plurality of first coolant pipes, a second inlet connection 250 for the inlet of the second coolant into the plurality of second coolant pipes, and a second outlet connection 260 for the outlet of the second coolant from the plurality of second coolant pipes. The second box 220 has a first outlet connection 270 for the outlet of the first coolant from the plurality of first coolant pipes. In both boxes, separators 280 separate the circuit of the first coolant from the rest of the device. In the first box 210, a further separator 290 is shown which is placed between the second inlet connection 250 and the second outlet connection 260 and thus ensures that the U-flow (U-deflection) occurs due to the deflection of the second coolant in the second box.

The embodiment example of the device 100 shown in FIG. 2 has a length of 220 mm measured without the first base 210 and the second base 220, and a length of 240 mm measured with the first base 210 and the second base 220. Other dimensions can also be applied.

FIG. 3 shows a sketch-like depiction of a section through the first base 200 of the device in FIG. 2. A region of the device is shown in which the stacks of first and second coolant pipes are arranged, wherein for the sake of clarity only one upper and one lower coolant pipe of each stack is shown. Surrounding the region of the coolant pipes and between the individual stacks of coolant pipes are grooves 300 for a fluid-tight connection of a coolant tank and coolant separators to the device. The flange 230 surrounds an entire periphery of the device. In the upper or first base 210 shown in FIG. 3, the peripheral flange 230 is formed by additional material in the form of a protrusion to a height of e.g. 10 mm. A lower or second base 201 (not shown in the view in FIG. 3) can have a peripheral flange of additional material for example in the form of a protrusion of a height of 2 mm.

FIGS. 4a and 4b show two states during assembly of an intake module 400 for conducting charge air from a compressor of a vehicle to an internal combustion engine of the vehicle according to an embodiment example of the present invention.

FIG. 4a shows in a perspective view the intake module 400 which comprises a housing 410 and the device 100 for cooling charge air from FIG. 2. The housing 410 forms a flow channel for charge air, into which the charge air flows in a flow direction 420 marked by an arrow. A receiver region for the device 100 is accessible through an opening 430 in the housing 410. FIG. 4a shows the device 100 partly inserted into the housing 410 through the opening 430. The device 100 is inserted in the housing 410 such that the first cooler part connected with the high-temperature coolant circuit forms a pre-cooler 440 and the second cooler part connected with the low-temperature coolant circuit forms a main cooler 450. In relation to the flow direction 420 of the charge air, the precooler 440 is connected upstream of the main cooler 450.

FIG. 4b shows the intake module 400 in ready-installed state. Here the device 100 is inserted completely in the housing 410. The flange 230 of the upper or first base 200 of the device 100 lies on an edge of the opening in the housing and terminates this.

FIGS. 4a and 4b show that the two bases of the cooler 100 are formed such that the first or upper base 200 can function as the flange 230 while the lower base is structured such that it forms a smaller protrusion. This gives the possibility of sideways insertion of the device 100 in the housing of the intake module 400.

As well as the embodiment examples shown in the figures, there are further alternatives for implementation of the approach proposed here. The high-temperature part of the cooler can also be formed in U-flow construction and hence the cooler can be formed as a four-row system. Also the ribs can be separated while retaining the general construction form, if this brings thermodynamic advantages. There is also the possibility of forming the high-temperature part in a different pipe depth to the subsequent low-temperature part while retaining the continuous rib. Furthermore a design with other bases can be implemented if the cooler is laid rather than inserted in the intake module housing.

The embodiment examples described are selected merely as examples and can be combined with each other.

The invention claimed is:

1. An intake module for supplying an internal combustion engine of a vehicle with compressed and cooled charge air, wherein the intake module comprises the following features:
    a housing for conducting the charge air from a compressor of the vehicle to the internal combustion engine of the vehicle, wherein the housing forms a flow channel for the charge air and has an opening for receiving a device for cooling charge air for an internal combustion engine of a vehicle; and
    a device for cooling charge air for an internal combustion engine of a vehicle wherein the device comprises the following features:
        a plurality of first coolant pipes for conducting a first coolant;
        a plurality of second coolant pipes for conducting a second coolant, wherein the first coolant pipes and the second coolant pipes extend along a longitudinal extension direction of the device and the plurality of first coolant pipes is arranged adjacent to the plurality of second coolant pipes in a transverse extension direction of the device;
        a first base and an associated tank which surrounds an end region of the plurality of first coolant pipes and of the plurality of second coolant pipes, and
        a second base and associated tank which surrounds a further end region opposite the end region of the plurality of first coolant pipes and of the plurality of second coolant pipes;
        wherein the tanks have separators that prevents mixing of the first coolant and second coolant,
        wherein the device is received by the opening in the housing such that the plurality of first coolant pipes and the plurality of second coolant pipes are arranged transverse to the flow channel for the charge air, such that the plurality of first coolant pipes is located upstream in the flow channel and the plurality of second coolant pipes is located downstream in the flow channel,
        wherein the first base has a flange which extends at least partly around a periphery of the device, wherein the flange mounts the device to the housing and seals the flow channel within the intake module against the outside of the intake module.

2. The intake module as claimed in claim 1, wherein the first tank has a first inlet connection or outlet connection for the inlet or outlet of the first coolant into/out of the plurality of first coolant pipes, and a second inlet connection for the inlet of the second coolant into the plurality of second coolant pipes.

3. The intake module as claimed in claim 1, wherein the second tank furthermore comprises a first outlet or inlet connection for the outlet or inlet of the first coolant from the plurality of first coolant pipes and/or the first tank comprises a second outlet connection for the outlet of the second coolant from the plurality of second coolant pipes.

4. The intake module as claimed in claim 1, wherein the plurality of first coolant pipes and/or the plurality of second coolant pipes are connected using separators in the tanks such that for the first and/or the second coolant, an I-flow or a U-flow through the device is achieved.

5. The intake module as claimed in claim 4, wherein the plurality of first coolant pipes are connected such that an I-flow through the device is achieved.

6. The intake module as claimed in claim 1, wherein the tanks for the first coolant and second coolant respectively are formed separated.

7. The intake module as claimed in claim 1, in which the plurality of first coolant pipes and/or the plurality of second coolant pipes are present as u-shaped bent pipes.

8. The intake module as claimed in claim 1, wherein the device furthermore comprises a plurality of ribs for conducting the charge air, wherein each rib of the plurality of ribs is arranged between a layer of coolant pipes of the plurality of first coolant pipes and an adjacent layer, in the transverse extension direction of the device, of the plurality of second coolant pipes.

9. A system for conditioning charge air for an internal combustion engine of a vehicle, wherein the system comprises the following features:
- an intake module for supplying an internal combustion engine of a vehicle with compressed and cooled charge air as claimed in claim 1;
- a high-temperature coolant circuit for conducting the first coolant, which has a high temperature, wherein the high-temperature coolant circuit is connected with the plurality of first coolant pipes; and
- a low-temperature coolant circuit for conducting the second coolant, which has a low temperature, wherein the low-temperature coolant circuit is connected with the plurality of second coolant pipes.

10. The intake module as claimed in claim 1, wherein flange comprises a stop device that limits the insertion of the device in the housing such that the device is positioned in the housing of the intake module in the correct position.

\* \* \* \* \*